United States Patent
Hager et al.

(10) Patent No.: US 10,951,685 B1
(45) Date of Patent: Mar. 16, 2021

(54) ADAPTIVE CONTENT DEPLOYMENT

(71) Applicant: Poetic Systems, LLC, Houston, TX (US)

(72) Inventors: Matthew Hager, Houston, TX (US); Chuong Le, Houston, TX (US); Armin Zardkoohi, Houston, TX (US)

(73) Assignee: Poetic Systems, LLC, Houston, TX (US)

( * ) Notice: Subject to any disclaimer, the term of this patent is extended or adjusted under 35 U.S.C. 154(b) by 81 days.

(21) Appl. No.: 16/517,357

(22) Filed: Jul. 19, 2019

Related U.S. Application Data

(60) Provisional application No. 62/700,902, filed on Jul. 19, 2018.

(51) Int. Cl.
  *G06F 15/16* (2006.01)
  *H04L 29/08* (2006.01)
  *G06F 16/958* (2019.01)
  *G06N 5/04* (2006.01)
  *G06N 20/00* (2019.01)

(52) U.S. Cl.
  CPC .......... *H04L 67/06* (2013.01); *G06F 16/958* (2019.01); *G06N 5/04* (2013.01); *G06N 20/00* (2019.01); *H04L 67/02* (2013.01)

(58) Field of Classification Search
  CPC .......... H04L 67/06; H04L 67/02; G06N 5/04; G06N 20/00; G06F 16/958

USPC ........................................................ 709/219
See application file for complete search history.

(56) References Cited

U.S. PATENT DOCUMENTS

| | | | |
|---|---|---|---|
| 2010/0082682 A1* | 4/2010 | Kinoshita | G06F 16/958 707/784 |
| 2014/0122511 A1* | 5/2014 | Waye | G06F 16/21 707/756 |
| 2016/0162779 A1* | 6/2016 | Marcus | G06N 20/00 706/12 |

\* cited by examiner

*Primary Examiner* — Tu T Nguyen
(74) *Attorney, Agent, or Firm* — Gregory Fettig; Rachel H. Huffstetler; FisherBroyles, LLP

(57) ABSTRACT

Systems and methods presented herein provide for adaptive content delivery. In one embodiment, a system includes a repository operable to store a plurality of web components, and a database operable to store identifiers of a plurality of users. The system also includes a machine learning module operable to: generate a model of computing device interactions of the plurality of the users based on the stored identifiers of the plurality of users; monitor a computing device interaction of a first of the plurality of users; process the computing device interaction of the first user through the model; and predict a format of web component delivery desired by the user based on the model. A formatter may be operable to retrieve a portion of the web components from the repository, and to automatically format the retrieved web components for the first user based on the predicted format of web component delivery.

14 Claims, 6 Drawing Sheets

000000

ADAPTIVE CONTENT DEPLOYMENT

CROSS REFERENCE TO RELATED APPLICATIONS

This patent application claims priority to, and thus the benefit of an earlier filing date from, U.S. Provisional Patent Application No. 62/700,902 (filed Jul. 19, 2018), the contents of which are hereby incorporated by reference.

BACKGROUND

Content delivery exists in a variety of forms. For example, in a streaming video context, a user may navigate to a website via a web browser or navigate through another application (e.g., an "app" on a streaming video device), select content (e.g., audio, video, text, images, etc.), and stream that content to the user's device at the user's discretion.

Some forms of content delivery include advertisements that are inserted into webpages. For example, a user may be interested in a certain product and may navigate various websites searching for that product. The user's web browser may collect data on the user's searches for the product. That data may then be used to select various advertisements for that product that are ultimately delivered into other websites that the user may navigate to. To illustrate, a user may desire a certain brand/model of a new vehicle. As the user searches various websites for that brand/model of vehicle, the user's web browser may collect data pertaining to those searches. Then, when the user navigates to another website (e.g., to read the news), an "ad server" may place vehicle advertisements pertaining to that brand/model vehicle into the other website.

While some ad servers may be able to predict to some degree what type of advertisement a user would like to view, ad servers are not able to predict how a user would like to view such content. For example, ad servers do not automatically reconfigure content to provide a viewing format that would be desirable to a user. Rather, ad servers simply drop advertisements into predetermined/preconfigured locations of websites.

SUMMARY

Systems and methods presented herein provide for a server based adaptive content delivery. In one embodiment, a system includes a repository operable to store a plurality of web components, and a database operable to store identifiers of a plurality of users. The system also includes a machine learning module operable to generate a model of computing device interactions of the plurality of the users based on the stored identifiers of the plurality of users, to monitor a computing device interaction of a first of the plurality of users, to process the computing device interaction of the first user through the model, and to predict a format of web component delivery desired by the user based on the model. A formatter may be operable to retrieve a portion of the web components from the repository, and to automatically format the retrieved web components for the first user based on the predicted format of web component delivery.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles that are included within the scope of the embodiments. Furthermore, any examples described herein are intended to aid in understanding the principles of the embodiments and are to be construed as being without limitation to such specifically recited examples and conditions. As a result, the embodiments are not limited to any specific examples described below.

Figure 1:
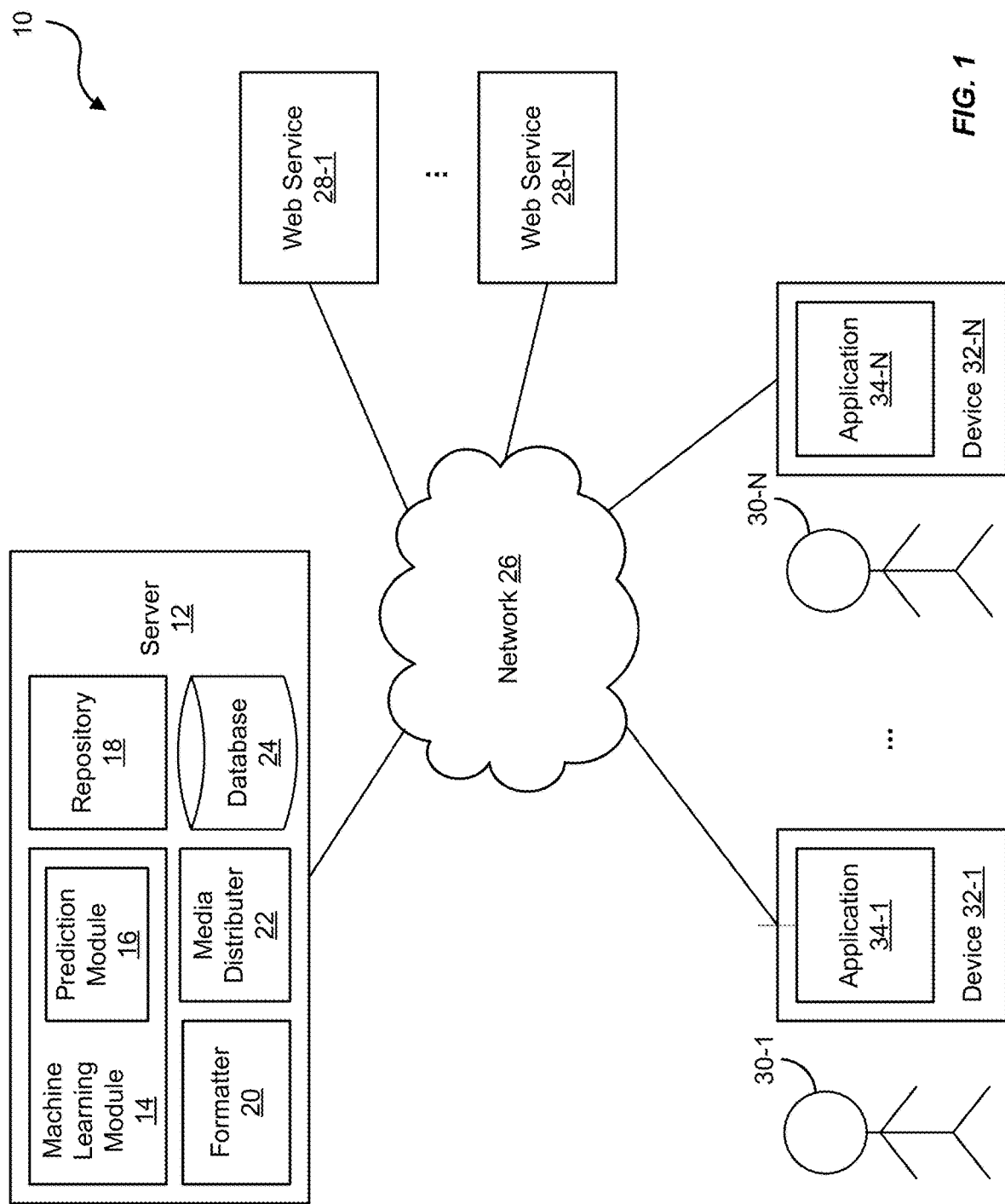
FIG. 1 is a block diagram of an exemplary adaptive content delivery system.

FIG. 1 is a block diagram of an exemplary adaptive content delivery system 10.

The content delivery system 10 is generally server-based (e.g., configured with an Internet server 12) and is operable to process a variety of forms of data from a plurality of users 30-1-30-N (where the "N" reference is merely an integer greater than "1" and not necessarily equal to any other "N" references shown or described herein). For example, a first user 30-1 may use a device 32-1 to interact with an application 34-1 configured therewith. The application 34-1 may collect various forms of information from the user 30-1, such as Internet searches, website selections, information input by the user, the identification of the device 32-1 (e.g., media access control (MAC) address, machine ID, IP address, etc.), a location of the device 32-1 (e.g., via GPS on the device), peripheral movement (e.g., computer mouse motion), human-device interactions (e.g., finger touches on a smartphone and voice commands), etc. A server 12, communicatively coupled to the user device 32-1 via the network 26 (e.g., the Internet) may capture this information and parse the information into a plurality of user identifiers that may be stored in a database 24.

A machine learning module 14 of the server 12 may be operable to generate a model of user interactions with the user devices 32-1-32-N so as to predict a more desirable format of the application 34 for a particular user 30 and thus drive a more desirable outcome for a website operator. For example, in an e-commerce embodiment, the user 30-1 may be searching for a particular product or service over the Internet. In some instances, the user 30-1 may use a web browser to access a web service 28, such as an Internet search engine. The web service 28 may initially collect some information pertaining to the user's interaction with the web service 28. The web service 28 may then direct the user's application 34-1 to a website operated by the server 12. The web service 28 may forward the collected information to the server 12, which may then be formatted in the database 24. The server 12 may collect similar information from a plurality of users 30 so as to generate an initial model of how the users 30 interact with the web service 28. The server 12 may then collect additional information pertaining to each of the user's interactions with the website operated by the server 12 to enhance the model.

The server 12 may also include a repository 18 that is operable to store a variety of forms of content, such as audio modules, text modules, application modules, video modules, image modules, mapping modules, etc. (collectively referred to herein as "web components"). A formatter 20 configured with a server 12 may be operable to retrieve one or more of these web components from the repository 18 and format them in a manner desirable to the user so as to provoke a desirable outcome for a website operator operating the server 12. In this regard, the machine learning module 14 may collect and process information resulting from a user's interactions with, for example, the device 32-1 through the model of the computing device interactions of the user's 30-1-30-N to predict a desirable format of various web components in the repository 18 for the user. Based on this prediction, the formatter 20 may select certain modules from the repository 18 and format them in a way it is desirable for presentation to the user 30-1. Then, a media distributor 22 configured with the server 12 may deliver the content through the network 26 to the user's application 34-1.

In some embodiments, the model is updated to further enhance predictions of content desired by the users 30. For example, as more user identifiers are added to the database 24 due to information being collected from the user devices 32, the machine learning module 14 may periodically refine the model (e.g., hourly, daily, weekly, monthly, seasonally, yearly, etc.) to enhance predictions of user desired content formats. In some embodiments, the model is generated based on a regression analysis (e.g., linear regression) of the user identifiers.

Linear regression is a form of supervised learning. In supervised learning, an algorithm uses incoming data to assess the probability and calculate possible outcomes. Other examples of supervised learning that can be used independently or in conjunction with linear regression include logistical regression, random forest, neural networks, and naive bayes. These are only some examples that can be used to make predictions. And, for performing real-time predictions and dynamically rearranging content within an application to expedite a desired outcome(s), the machine learning module 14 may use any combination of supervised learning, unsupervised learning, and semi-supervised learning algorithms to iteratively improve the model, to adjust the application's arrangement of content, and/or to assess the effectiveness of other models.

In this regard, as more user identifiers are added to the database 24, the machine learning module 14 may be able to predict (e.g., via the prediction module 16) an initial format for any subsequent new user 30 based on an initial collection of that user's information.

Based on the foregoing, the server 12 is any device, system, software, or combination thereof operable to implement a machine learning module that predicts a format of content desirable for, and to communicate that formatted content to, a user 30. Examples of the server 12 include Internet servers, network computing devices, etc. The network 26 is any communication medium operable to provide communications between the server 12 and a plurality of user devices 32. Examples of the network 26 include the Internet, local area networks, wide-area networks, and other data networks. Examples of the user devices 32 (also referred to herein as computing devices) include laptop computers, smart phones, tablet computers, desktop computers, streaming video devices, and the like.

Figure 2:
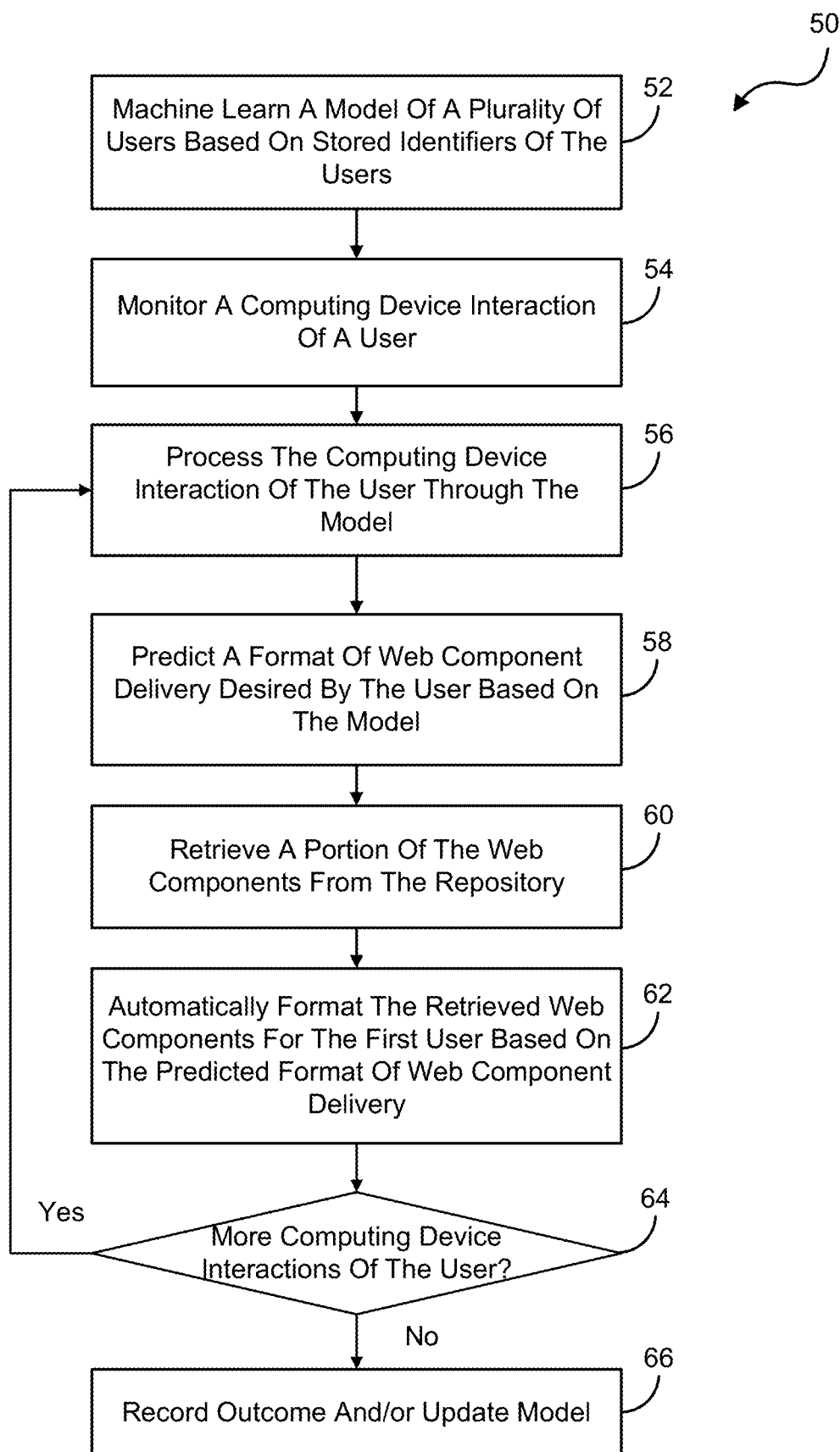
FIG. 2 is a flowchart of an exemplary process of the adaptive content delivery system of FIG. 1.

With this in mind, FIG. 2 is a flowchart of an exemplary process 50 operable with the server 12. In this embodiment, the machine learning module 14 learns a model of a plurality of users 30 based on stored identifiers of the users 30, in the process element 52. For example, information from a plurality of users 30 may be collected over time and formatted into a plurality of identifiers, shown and described in greater detail below. The machine learning module 14 may perform a regression analysis (e.g., linear regression) on the identifiers and generate a model that classifies how various users 30 are likely to interact with content presented to their various user devices 32.

From there, the server 12 may monitor a subsequent computing device 32 and the user's interactions therewith, in the process element 54. The server 12 may then process one or more of the computing device interactions of the user 30 through the model, in the process element 56, to predict a format of web component delivery desired by the user 30 based on the model, in the process element 58 (e.g., in concert with the computing device interactions of the user 30). For example, when the server 12 is in communication with the application 34 of the user device 32, the server 12 may collect some initial data regarding the user's interactions with the user device 32. The machine learning module 14 may process this initial data through the model such that the prediction module 16 can predict an initial format of web component delivery desired by the user 30.

Once the prediction is formed, the prediction module 16 may direct the formatter 20 to retrieve a portion of the web components from the repository 18, in the process element 60. For example, the prediction module 16 may predict that the user 30 would desire certain image modules, certain text modules, and mapping modules that are resident within the repository 18. The prediction module 16 may also predict how the web components would be desirably formatted for the user 30. Accordingly, the prediction module 16 may direct the formatter 20 to retrieve the web components from the repository 18 and automatically format them within the user's application 34 of the user's device 32 based on the predicted format, in the process element 62.

The server 12 may then monitor subsequent user interactions with the user device 32, in the process element 64. In doing so, the server 12 may collect additional data/information based on the subsequent user interactions with the user's device 32 and process that information either alone or with the previously collected information from the user 30 through the model (e.g., the process element 56). If no other computing device interactions of the user 30 have been detected, the server 12 may record the outcome of the previous computing device interactions of the user 30 to update the database 24 and/or update the model, in the process element 66.

To provide one real world example, suppose a user 30 is interested in identifying a rental property, such as an apartment. The user 30 may initiate a search via a web browser (e.g., the application 34) operable with the user's device 32. In doing so, the user 30 may navigate to a search engine (e.g., the web service 28) and type in "looking for a two-bedroom apartment in the Woodlands area near Houston Tex. that is dog friendly". The search engine may obtain some initial information pertaining to the user 30, such as a device ID, MAC address, IP address, device location, etc. The search engine may also parse the text from the search string (e.g., and correct any misspellings) and search for various websites that the user 30 may be interested in searching for apartments. The search engine may then present a list of apartment finding websites and present that list to the user 30 via the webpage of the user device 32.

When the user 30 navigates to one of the apartment finding websites, the server 12 of the selected apartment finding website may collect the information initially obtained by the search engine. The server 12 may process this initial information using the machine learning module 14 to retrieve web components from the repository 18 of the server 12. For example, using just the entered text of "looking for a two-bedroom apartment in the Woodlands area near Houston Tex. that is dog friendly", the machine learning module 14 may predict that the user 30 would prefer to see images of apartments with dogs present. Accordingly, the prediction module 16 may direct the formatter 20 to retrieve images with dogs present and/or simply images of dogs, from the repository 18. The prediction module 16 may also direct the formatter 20 to retrieve a map module from the repository that forms a map of the Woodlands area. The prediction module 16 may also direct the formatter 20 to retrieve icons of dogs and automatically insert those icons into the map of the Woodlands area indicating where apartments that are dog friendly can be found. Then, based on the model, the prediction module 16 may predict how the web components should be arranged within the user's web browser and direct the formatter 20 to arrange the retrieved web components accordingly. In some embodiments, the formatter 20 may also reconfigure various web components (e.g., manipulating pixel resolution), Thereafter, the formatter 20 delivers the formatted web components to the media distributor 22, which in turn delivers the formatted web components to the user's web browser for viewing via the apartment finding website.

As some of these web components may be interactive, the machine learning module 14 may process subsequent/additional information from the user's device 32 as the user 30 interacts with the apartment finding website. For example, the user 30 may "click" on one or more of the dog icons located in the map module presented to the user 30 (e.g., indicating that a dog friendly apartment may be located there). Information pertaining to those selections may be collected and processed by the machine learning module 14 via the model to predict other and/or additional web components from the repository 18 which may be desired by the user 30.

Such is not a simple comparison, but rather a process that drives the user 30 to a conclusion (e.g., contact an apartment complex about availability and/or pricing). For example, as the user 30 navigates through the website and selects certain apartments from the map module, the machine learning module 14 may process those selections through the model to learn what the user 30 might next desire in a formatted presentation. To illustrate, suppose the user 30 has "clicked" back and forth between two apartment selections from the map module presented to the user's device 32. The machine learning module 14 may process the information from these two apartment selections and automatically format a chat room within the website that includes contact information (e.g., text and/or application modules) of the two apartment selections retrieved from the repository 18. In other words, the machine learning module 14 continually processes information received from the user 30 through the user's device 32 to enhance the prediction and drive the user 30 to a conclusion.

Although one example has been discussed with respect to an apartment finding website, the embodiments disclosed herein may be operable with a plurality of websites and/or other applications. For example, if a user 30 is looking for services (e.g., plumbing, heating, dentistry, veterinarians, etc.), modules could be created and stored with the repository 18 specific to those types of services. Datasets, such as those shown and described below, could be altered accordingly such that the machine learning module 14 generates a user model to predict how websites for those services could be automatically configured by the server 12.

Figure 3:
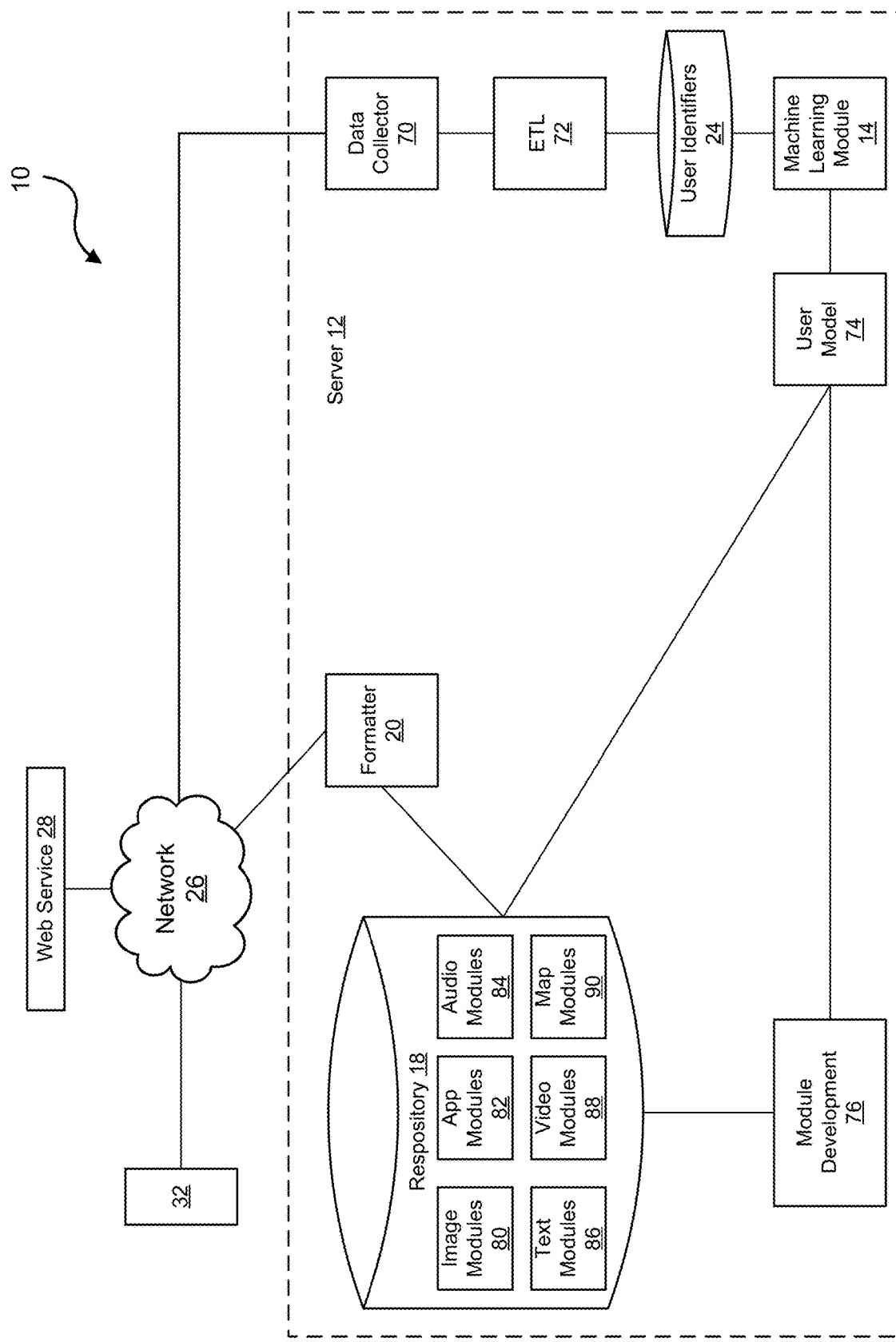
FIG. 3 is another block diagram of the adaptive content delivery system of FIG. 1.

FIG. 3 is another block diagram of the adaptive content delivery system 10. In this embodiment, the user device 32 may communicatively couple to the network 26 to communicate with the server 12. In doing so, the user device 32 may navigate through the Internet to the web service 28 (e.g., to search for a website of the server 12). Alternatively or additionally, the user device 32 may communicate directly with the server 12 without the assistance of the web service 28.

In either instance, the user device 32 transfers information that is consumed by the server 12 via a data collector 70. As mentioned, the information may come in a variety of forms including, for example, machine IDs, MAC addresses, IP addresses, etc. This information may also include data pertaining to web links that have been selected by the user 30, contact information of the user 30 (e.g., email addresses, phone numbers, etc.), Internet searches, information input by the user, a location of the device 32-1 (e.g., via GPS on the device), peripheral movement (e.g., computer mouse motion), human-device interactions (e.g., finger touches on a smartphone and voice commands), and the like. For example, as a user 30 navigates through a website provided by the server 12, the user 30 may be prompted with contact information to call the operator of the website. In the case of a smart phone, the user 30 may be provided the phone contact such that the user 30 may select the phone number via the touchscreen interface of the smart phone to call the website operator. Once the user 30 chooses to call the website operator, phone contact information pertaining to the user 30 may be transferred from the user device 32 to the server 12 where it is collected by the data collector 70. Similarly, an email link may be provided to the user 30 to launch an email application from the user device 32. The user's email information may then be forwarded to the server 12 for consumption by the data collector 70.

The data collector 70 may temporarily house the data pertaining to the user 30 and/or the data from the user device 32. Generally, this data is in a raw form and may be categorized simply by machine ID and/or user ID until the data can be mined and organized. In this regard, the server 12 may also include an Extract, Transform, and Load (ETL) module 72 that mines the raw data to parse out identifiers of the user 30 for subsequent processing via the user model 74.

Prior to that, however, the user model needs to be built. Thus, as the server 12 is in communication with a plurality of user devices 32 (e.g., thousands and even hundreds of thousands or more), the data collector 70 captures information from each of these devices 32 and the ETL module 72 mines the raw data from those devices 32 to parse out the identifiers of each of the users 30 in communication with the server 12. Generally, this data includes each action performed by a user 30, along with the action's meta-data (e.g., including web buttons clicked, text located on the button, and where was the button located in the page). The ETL module 72 converts and transforms the data into a format that the machine learning module 14 can process. Table 1 below provides one exemplary format of the user's actions.

TABLE 1

User Actions

| MachineID | SessionID | PageViewed |
|---|---|---|
| MachineA | SessionX | Home |
| MachineA | SessionX | Product 1 |
| MachineA | SessionY | Product 2 |
| MachineA | SessionZ | Checkout |
| MachineB | SessionJ | Contact Us |
| MachineB | SessionJ | Blog Main Page |
| MachineB | SessionJ | Blog Post |

MachineID is unique to the device a user 30 is using to browse the application (e.g., a smart phone, laptop, tablet computer, etc.). One assumption may be made in that, if the same machine ID comes back to the application 34 (e.g., of FIG. 1—a website), then it is the same user 30 using that device 32. Thus, each machine ID may be generally associated with one user 30, even if the user 30 uses different devices to access the application 34. The SessionID is unique to the number of sessions the user 30 uses the application 34. In some embodiments, if there is more than 30 minutes of inactivity on the application 34, the session may be considered to have ended. Thus, the next time the user 30 visits the application 34, the user 30 may be assigned a new SessionID. An example of such is indicated in Table 2. In Table 2, the user 30 operating on "MachineA" (e.g., a user device 32) has three separate sessions, indicating that the user 30 used the application 34, and left three times. The user 30 operating on MachineB by contrast only used the application 34 one time.

Since one object of the machine learning module 14 is to predict actions of users 30, the machine learning module 14 aggregates a list of events and groups them by MachineID. Alternatively or additionally, the machine learning module 14 may indicate certain events that are "factors" and which of these events include a "desired outcome". In this example, the desired outcome is flagged when the user 30 viewed a "Checked Out" button on the application 34 to make a purchase. The factors may also include other pages that the user 30 may have visited. The transformed data format of the data above would be used by the machine learning module 14 in a manner illustrated in Table 2.

may be automated and updated at any desired interval to improve the accuracy of the user model 74 (e.g., hourly, daily, weekly, seasonally, annually, etc.).

In some embodiments, another layer in the ETL process 72 includes preparing the dataset to contain an even distribution of records—e.g., those that performed the desired outcome, and those that did not perform the desired outcome. For example, 50% of the dataset may have logical "1" for the desired outcome column (e.g., ViewCheckOut), and the remaining 50% of the dataset may have a logical "0" for the desired outcome. This is so that the machine learning module 14 is not skewed by 99% of the dataset doing one thing, and the remaining 1% of the dataset doing another, which may lead to inaccurate predictions.

The data listed in Tables 1 and 2 only show examples of the types of data that may be employed by the machine learning module 14. Generally, there are many other types of data that are also used in conjunction with the data presented in Tables 1 and 2. For example, the machine learning module 14 may process a variety of terms and data from a data dictionary that accounts for user's intention, while separating a user's intent from the user's action. The purpose of tracking user intentions over user actions is to gauge the user's interests. For example, how a user 30 completes an action may not matter. But, the fact that the user 30 chose to complete an action may. If the user's intent cannot be proven, then there is no action. If the user's intent can be proven, however, that information may be stored and used to generate the model 74 to predict a desirable outcome.

Normalized factors of the data dictionary may include the factors that can represent a user's intentions on a website. The normalized factors may be parsed by factor with their respective attributes and definitions used for determining the probability of a conversion (e.g., a purchase, rental, etc.). In some embodiments, the normalized factors can be cloned to produce an agency specific version. For example, a website operator could remove factors that are not used in their system and/or add other factors. Thus, some attributes may be given with an initial default value of "null", meaning that the attribute is unknown, fails, and/or is not yet true (e.g., when they are not used).

Examples of these normalized factors include applications used, contacts that have been made (e.g., phone calls, email, etc.), chat rooms that have been opened, services being viewed, individual products being viewed, and various other attributes. Some examples of datasets that may be used are shown in an apartment finding context in the following Tables 3-7.

TABLE 2

Transformed Data for Machine Learning to Consume

| MachineID | SessionCount | ViewedHome | ViewedProduct | ViewedContactUs | ViewedCheckout |
|---|---|---|---|---|---|
| MachineA | 3 | 1 | 1 | 0 | 1 |
| MachineB | 1 | 0 | 0 | 1 | 0 |

As can be seen in Table 2, with the exception of the SessionCount field (e.g., a total number of unique sessions a particular user 30), each of the user's actions on the application 34 may be aggregated and converted to a binary format to indicate whether the user 30 performs some action. This dataset may then be transferred to the machine learning module 14 to train and otherwise generate the user model 74. The ETL process 72 used in generating the user model 74

TABLE 3

Application Factors

| Attribute | Type | Allow Null | Default Value | Definition |
|---|---|---|---|---|
| type | STRING | false | "applied" | The category of factor for user intentions. |

TABLE 3-continued

Application Factors

| Attribute | Type | Allow Null | Default Value | Definition |
|---|---|---|---|---|
| machineID | UUID | false | N/A | A unique identifier for user machines. |
| userID | STRING | true | N/A | A unique identifier for users. |
| sessionID | UUID | false | N/A | A unique identifier for user sessions. |
| device | STRING | false | N/A | The details of the machine the user is operating off of. |
| ipAddress | STRING | false | N/A | A unique string of numbers separated by periods that identifies each computer using the Internet Protocol to conimunicate over a network. |
| timestamp | Datetime UTC | false | N/A | A digital record of the time of occurrence of a particular event. |
| value | STRING | false | N/A | The quote ID. |
| scope | OBJECT | true | null | See Community scope, or Unit scope, or Floor Plan scope, or Page scope, or null |
| leaseID | STRING | true | null | A string of characters representing a user's unique lease ID. |

TABLE 4

Call Factors

| Attribute | Type | Allow Null | Default Value | Definition |
|---|---|---|---|---|
| type | STRING | false | "Called" | The category of factor for user intentions. |
| machineID | UUID | false | N/A | A unique identifier for user machines. |
| userID | STRING | true | N/A | A unique identifier for users. |
| sessionID | UUID | false | N/A | A unique identifier for user sessions. |
| device | STRING | false | N/A | The details of the machine the user is operating off of. |
| ipAddress | STRING | false | N/A | A unique string of numbers separated by periods that identifies each computer using the Internet Protocol to communicate over a network. |
| timestamp | Datetime UTC | false | N/A | A digital record of the time of occurrence of a particular event. |
| value | STRING | false | N/A | A phone number represented in E.164 format |
| scope | OBJECT | true | null | See Community scope, or Unit scope, or Floor Plan scope, or Page scope, or null |
| pageURL | STRING | true | null | A URL representing the page a user was viewing at that time. |

TABLE 5

Chat Factors

| Attribute | Type | Allow Null | Default Value | Definition |
|---|---|---|---|---|
| type | STRING | false | "Chatted" | The category of factor for user intentions. |
| machineID | UUID | false | N/A | A unique identifier for user machines. |
| userID | STRING | true | N/A | A unique identifier for users. |
| sessionID | UUID | false | N/A | A unique identifier for user sessions. |
| device | STRING | false | N/A | The details of the machine the user is operating off of. |
| ipAddress | STRING | false | N/A | A unique string of numbers separated by periods that identifies each computer using the Internet Protocol to communicate over a network. |
| timestamp | Datetime UTC | false | N/A | A digital record of the time of occurrence of a particular event. |
| value | STRING | false | N/A | A phone number represented in E.164 format |
| scope | OBJECT | true | null | See Community scope, or Unit scope, or Floor Plan scope, or Page scope, or null |
| pageURL | STRING | false | N/A | A URL representing the page a user was viewing at that time. |

TABLE 6

Viewed Community Factors

| Attribute | Type | Allow Null | Default Value | Definition |
|---|---|---|---|---|
| type | STRING | true | "Viewed-Commumty" | The category of factor for user intentions. |
| machineID | UUID | false | N/A | A unique identifier for user machines. |
| userID | STRING | true | N/A | A unique identifier for users. |
| sessionID | UUID | false | N/A | A unique identifier for user sessions. |
| device | STRING | false | N/A | The details of the machine the user is |
| ipAddress | STRING | false | N/A | A unique string of numbers separated by periods that identities each computer using the Internet Protocol to communicate over a network |
| timestamp | Datetime UTC | false | N/A | A digital record of the time of occurrence of a particular event. |
| value | STRING | true | N/A | |
| scope | OBJECT | true | null | See Community scope, or Unit scope, or Floor Plan scope, or Page scope, or null |

TABLE 7

Viewed Unit Factors

| Attribute | Type | Allow Null | Default Value | Definition |
|---|---|---|---|---|
| type | STRING | true | "ViewedUnit" | The category of factor for user intentions. |
| machineID | UUID | false | N/A | A unique identifier for user machines. |

TABLE 7-continued

Viewed Unit Factors

| Attribute | Type | Allow Null | Default Value | Definition |
|---|---|---|---|---|
| userID | STRING | true | N/A | A unique identifier for users. |
| sessionID | UUID | false | N/A | A unique identifier for user sessions. |
| device | STRING | false | N/A | The details of the machine the user is operating off of |
| ipAddress | STRING | false | N/A | A unique string of numbers separated by periods that identifies each computer using the Internet Protocol to communicate over a network. |
| timestamp | Datetime UTC | false | N/A | A digital record of the time of occurrence of a particular event |
| value | STRING | | | |
| scope | OBJECT | true | null | See Community scope, or Unit scope, or Floor Plan scope, or Page scope, or null |

As data is collected by the data collector 70 (e.g., from a plurality of users 30), the ETL module 72 may fill these datasets and store the data sets as user 30 identifiers in the database 24 (e.g., for each user 30) such that the machine learning module 14 can generate the user model 74 therefrom. Then, based on subsequent user interactions with a device 32 (e.g., while a user 30 is browsing the website), the user model 74 can be used to predict, in real-time, a format of the application 34 (e.g., a website) desired by the user 30 that would drive the user 30 to an optimal conclusion (e.g., a desired outcome) for the operator of the application 34. For example, the user model 74 can predict which of the image modules 80, application modules 82, audio modules 84, text modules 86, video modules 88, map modules 90, and/or other modules in the repository 18 that the formatter 20 uses and/or formats in a given website based on an analysis of the user identifiers.

To illustrate, the machine learning module 14 may aggregate each of the data fields where optimal outcomes occurred to generate the model 74. The machine learning module 14 may then process device interactions of a user 30 during a new session via the model 74 to predict a format of the web components that will drive the user 30 to a desired outcome. For example, with each computing device interaction of the user 30, the model 74 may form a real-time prediction of a format of web components that drives the user 30 to a desired outcome. In some embodiments, certain factors may be weighted in the user model 74 to influence the optimal conclusion. For example, a SessionCount may be ranked 4% in relation to the desired outcome, a ViewedHome may be ranked 1% in relation to the desired outcome, a ViewedProduct may be ranked 15% in relation to the desired outcome, a ViewedContactUs may be ranked 7% in relation to the desired outcome, and a ViewedCheckout may be ranked 36% in relation to the desired outcome.

In some embodiments, these factors may be used to develop additional modules for the repository 18. For example, the user model 74 may predict other modules that may be desired by a user 30 when viewing the application 34. These modules may not be present within the repository 18. Accordingly, a module development component 76 may use this prediction to automatically configure these modules. In doing so, the module development component 76 may retrieve software components and arrange them into a new software module that may be accessible to the formatter 20 from the repository 18.

Figure 4:
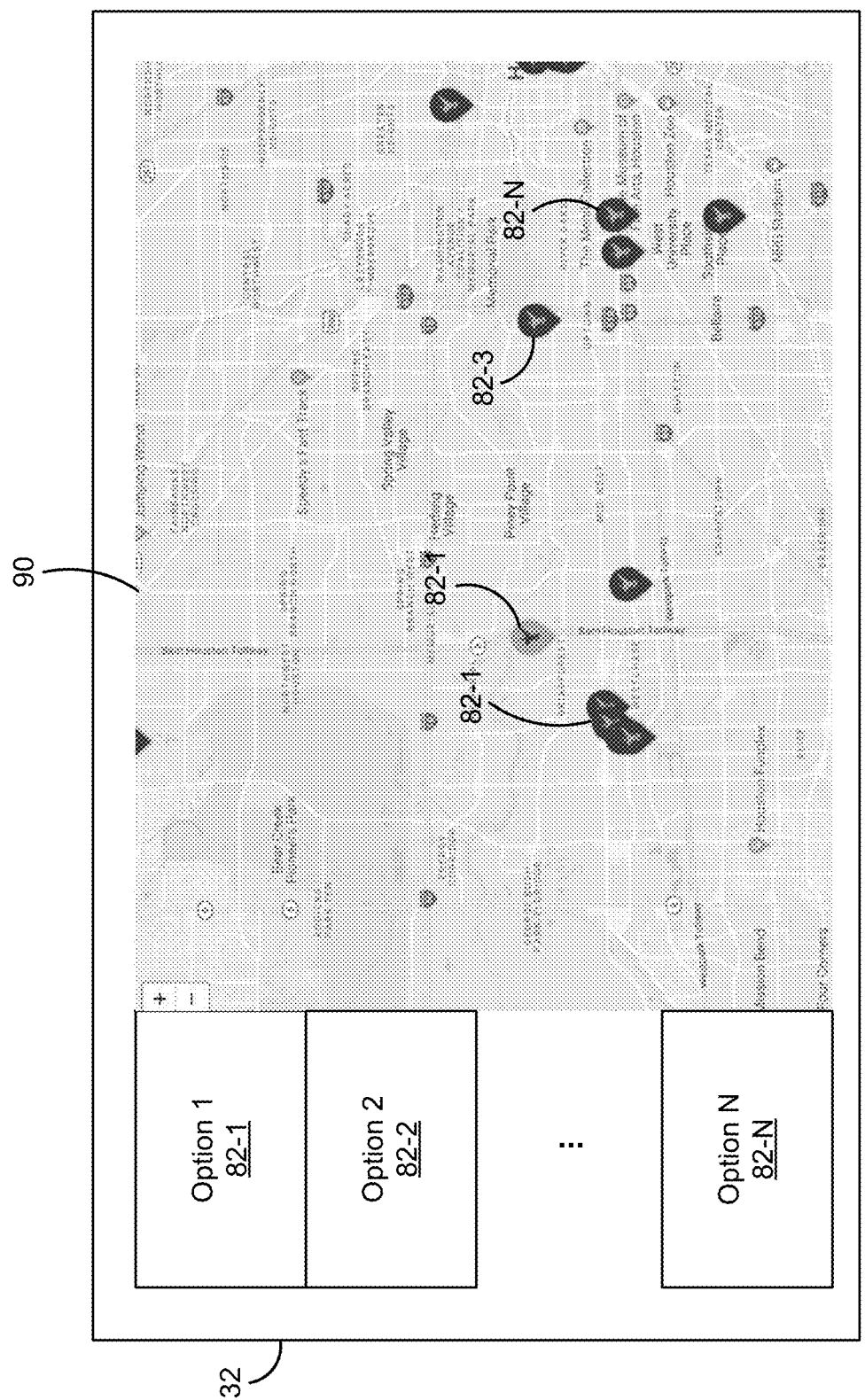
FIG. 4 is a diagram of an exemplary user interface.

FIG. 4 is a diagram of an exemplary user interface that may be operable with a user device 32. In this embodiment, a user 30 may be presented to the user device 32 via an application, such as a webpage, operable with the user device 32. Again, using the example of an apartment finding website, the user 30 may navigate to the apartment finding website in a variety of ways (e.g., through an Internet search engine, a link in another website, directly entering the website address in a browser, etc.). Based on this initial navigation to the apartment finding website, a certain amount of data may be collected (e.g., by the data collector 70) such that information may be extracted and formatted for the machine learning module 14. As this initial navigation may not include all the data of the aforementioned datasets, the initial prediction of the web site formatting may not be optimal. Accordingly, the user model 74 may employ one or more assumptions to render a prediction as to the optimal initial format of the webpage.

For example, a user 30 searching for an apartment may initially wish to view certain options of apartment complexes that are in an area desired by the user 30. Accordingly, the formatter 20 may list a plurality of options (i.e., selected from app modules 82-1-82-N) that at least indicate the initial features desired by the user 30. As the user 30 may also desire a map to indicate where those apartment complexes may be located, the formatter 20 may automatically load a map 90 with the options and automatically create icons corresponding to the options 82-1-82-N. In doing so, the formatter 20 may automatically insert links to the options 82-1-82-N as well as links to the icons corresponding to those options such that a user 30 may navigate to a website. Then, as the user 30 navigates to various other options, additional data may be collected by the data collector 70 to enhance the prediction of subsequent webpage formatting. An example of such is shown and described in FIGS. 5A and 5B.

Figure 5B:
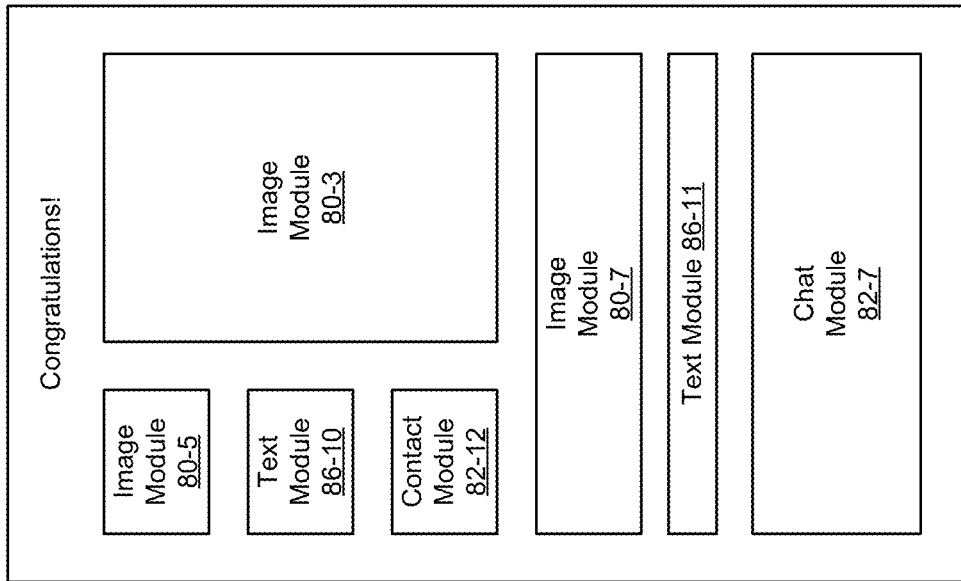
FIGS. 5A and 5B are diagrams of an exemplary user interface illustrating reformatting of web modules.
Figure 5A:
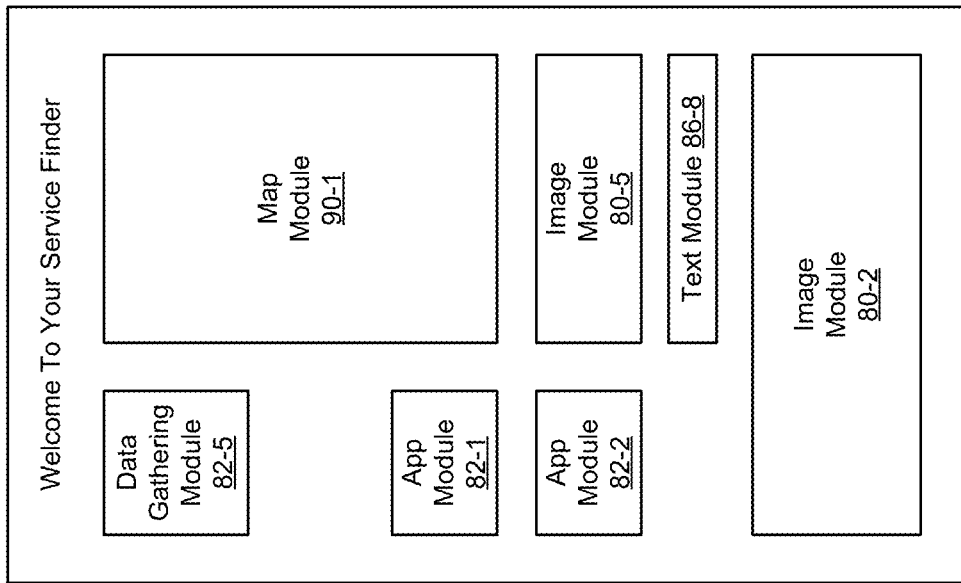

In FIG. 5A, the user 30 is presented with an initial user interface with certain modules that are available from the repository 18. Based on the initial collection of data, the user model 74 predicts a certain format that may be preferable to the user 30. The formatter 20 retrieves certain modules from the repository 18 and automatically formats them into the website in a manner based on the prediction. In this instance, the formatter 20 may retrieve a data gathering module (e.g., an app module 82-5) that allows the user 30 to input criteria that the user 30 is interested in (e.g., apartment complexes that have dog friendly, low crime rates, certain demographics, etc.). The formatter 20 may then automatically insert this module into the website based on the prediction by the user model 74.

Similarly, the formatter 20 may retrieve other app modules 82-1 and 82-2 from the repository 18 that have other functionalities (e.g., phone call functionalities, email functionalities, etc.) and automatically insert those into the website based on the prediction by the user model 74. The prediction may also be used to include various image modules 86, text modules 86, and map modules 90 that are located within the repository 18.

As the user 30 navigates through this website, the user 30 may select one or more these features that are initially presented to the user 30. From there, additional data is collected based on the user's navigation which may be used to enhance the prediction for a subsequent website build, as illustrated in FIG. 5B. In this embodiment, the user 30 is ultimately driven to a conclusion based on data collected from the user device 32 and processed through the user model 74. As can be seen in FIG. 5B, other modules (e.g., image modules 80-3, 80-5, 80-7, text modules 86-10 and 86-11, an app module 82-12 for contacting the desired service and/or product, and an app module 82-7 for chatting with a representative of the service and/or product) are inserted into the website in a manner that differs from that of FIG. 5A. Once the formatter 20 retrieves these modules from the repository 18, the formatter 20 automatically formats these modules based on the prediction by the user model 74.

Figure 6:
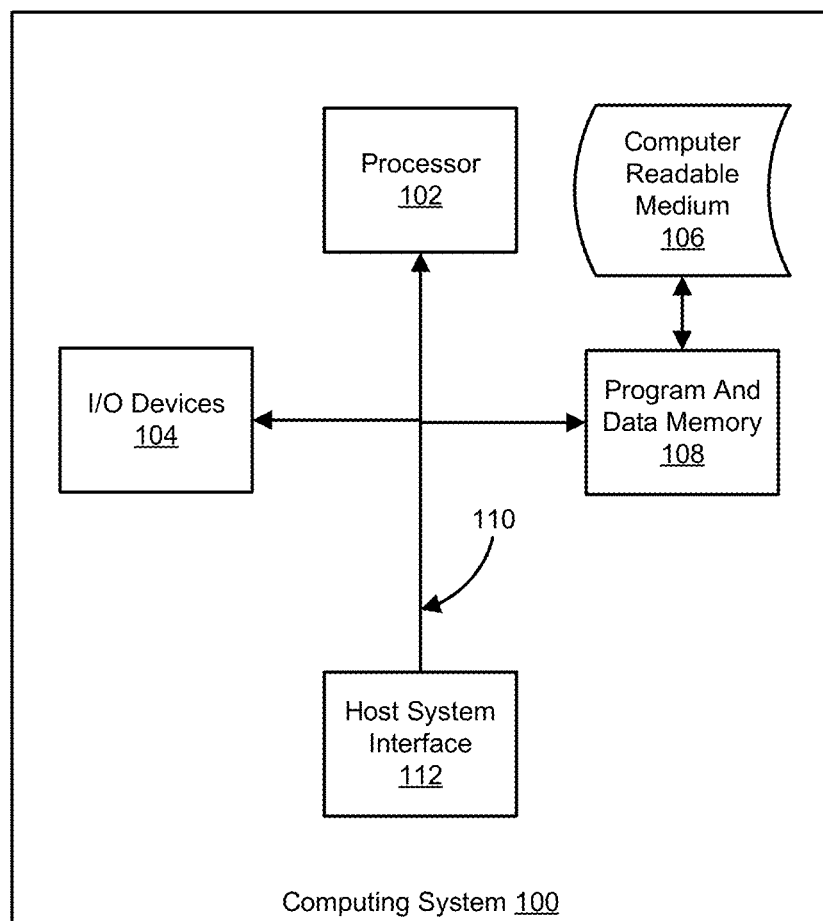
FIG. 6 is a block diagram of an exemplary computing system in which a computer readable medium provides instructions for performing methods herein.

The embodiments herein may be combined in a variety of ways as a matter of design choice. Accordingly, the features and aspects herein are not intended to be limited to any particular embodiment. Furthermore, the embodiments can take the form of hardware, firmware, software, or combinations thereof. In one embodiment, such software includes but is not limited to firmware, program code, resident software, microcode, etc. FIG. 6 illustrates a computing system 100 in which a computer readable medium 106 may provide instructions for performing any of the methods and processes disclosed herein.

Furthermore, some aspects of the embodiments herein can take the form of a computer program product accessible from the computer readable medium 106 to provide program code for use by or in connection with a computer or any instruction execution system. For the purposes of this description, the computer readable medium 106 can be any apparatus that can tangibly store the program code for use by or in connection with an instruction execution system, apparatus, or device, including the computing system 100.

The computer readable medium 106 can be any tangible electronic, magnetic, optical, electromagnetic, infrared, or semiconductor system (or apparatus or device). Some examples of a computer readable medium 106 include solid state memories, random access memories (RAM), read-only memories (ROM), magnetic disks, optical disks, etc. Some examples of optical disks include read only compact disks (CD-ROM), read/write compact disks (CD-R/W), and digital versatile disks (DVD).

The computing system 100 can include one or more processors 102 coupled either directly or indirectly to memory 108 through a system bus 110. The memory 108 can include local memory employed during actual execution of the program code, bulk storage, and/or cache memories, which provide temporary storage of at least some of the program code in order to reduce the number of times the code is retrieved from bulk storage during execution.

Input/output (I/O) devices 104 (including but not limited to storage devices, keyboards, displays, pointing devices, etc.) can be coupled to the computing system 100 either directly or through intervening I/O interfaces, such as Small Computer System Interface (SCSI) interfaces, Serial AT Attachment (SATA) interfaces, Serial Attached SCSI (SAS), Peripheral Component Interconnect (PCI) and PCI Express (PCIe) interfaces, Universal Serial Bus (USB) interfaces, Ethernet interfaces, WiFi interfaces, Bluetooth interfaces, to name a few. Network adapters can also be coupled to the computing system 100 to enable the computing system 100 to couple to other data processing systems (e.g., through host system interface 112), printers, and/or storage devices through intervening private or public networks. Modems, cable modems, and Ethernet cards are just a few examples of network adapter types.

What is claimed is:

1. A server based system, comprising:
a repository operable to store a plurality of web components;
a database operable to store identifiers of a plurality of users;
a machine learning module operable to generate a model of computing device interactions of the plurality of the users based on the stored identifiers of the plurality of users, to monitor a computing device interaction of a first of the plurality of users, to process the computing device interaction of the first user through the model, and to predict a format of web component delivery desired by the user based on the model; and
a formatter operable to retrieve a portion of the web components from the repository, and to automatically format the retrieved web components for the first user based on the predicted format of web component delivery,
wherein the machine learning module is further operable to process the computing device interaction of the first user via a regression analysis, and wherein the machine learning module is further operable to enhance a prediction of the format of web component delivery desired by the user via said regression analysis of subsequent computing device interactions of the first user.

2. The system of claim 1, wherein:
the web components comprise one or more of an image, text, video, audio, a mapping module, an icon, or a web based application.

3. The system of claim 1, wherein:
the machine learning module is further operable to update the model based on subsequent computing device interactions of the plurality of users.

4. The system of claim 1, wherein:
the formatter is further operable to change the format of the web component delivery based on the enhanced prediction.

5. The system of claim 1, further comprising:
a media distributer operable to deliver the formatted web components to the first user via a web-based application,
wherein the formatter is further operable to manipulate individual pixels of the formatted web components in the web-based application.

6. A method operable with a web server, comprising:
storing a plurality of web components in a repository;
storing identifiers of a plurality of users in a database;
machine learning a model of computing device interactions of the plurality of the users based on the stored identifiers of the plurality of users;
monitoring a computing device interaction of a first of the plurality of users;
processing the computing device interaction of the first user through the model via a regression analysis;
predicting a format of web component delivery desired by the user based on the model;
retrieving a portion of the web components from the repository;
automatically formatting the retrieved web components for the first user based on the predicted format of web component delivery; and
enhancing a prediction of the format of web component delivery desired by the user via said regression analysis of subsequent computing device interactions of the first user.

7. The method of claim 6, wherein:
the web components comprise one or more of an image, text, video, audio, a mapping module, an icon, or a web based application.

8. The method of claim 6, further comprising:
updating the model based on subsequent computing device interactions of the plurality of users.

9. The method of claim 6, further comprising:
changing the format of the web component delivery based on the enhanced prediction.

10. The method of claim 6, further comprising:
manipulating individual pixels of the formatted web components in the web-based application.

11. A non-transitory computer readable medium comprising instructions that, when executed by a processor, direct the processor to:
store a plurality of web components in a repository;
store identifiers of a plurality of users in a database;
machine learn a model of computing device interactions of the plurality of the users based on the stored identifiers of the plurality of users;
monitor a computing device interaction of a first of the plurality of users;
process the computing device interaction of the first user through the model via a regression analysis;
predict a format of web component delivery desired by the user based on the model;
retrieve a portion of the web components from the repository;
automatically format the retrieved web components for the first user based on the predicted format of web component delivery; and
enhance a prediction of the format of web component delivery desired by the user via said regression analysis of subsequent computing device interactions of the first user.

12. The non-transitory computer readable medium of claim 11, wherein:
the web components comprise one or more of an image, text, video, audio, a mapping module, an icon, or a web based application.

13. The non-transitory computer readable medium of claim 11, further comprising instructions that direct the processor to:
update the model based on subsequent computing device interactions of the plurality of users.

14. The non-transitory computer readable medium of claim 11, further comprising instructions that direct the processor to:
change the format of the web component delivery based on the enhanced prediction.

* * * * *